S. G. CRANE.
WEIGHING SCALE.
APPLICATION FILED DEC. 3, 1913.
1,287,645.
Patented Dec. 17, 1918.
2 SHEETS—SHEET 2.
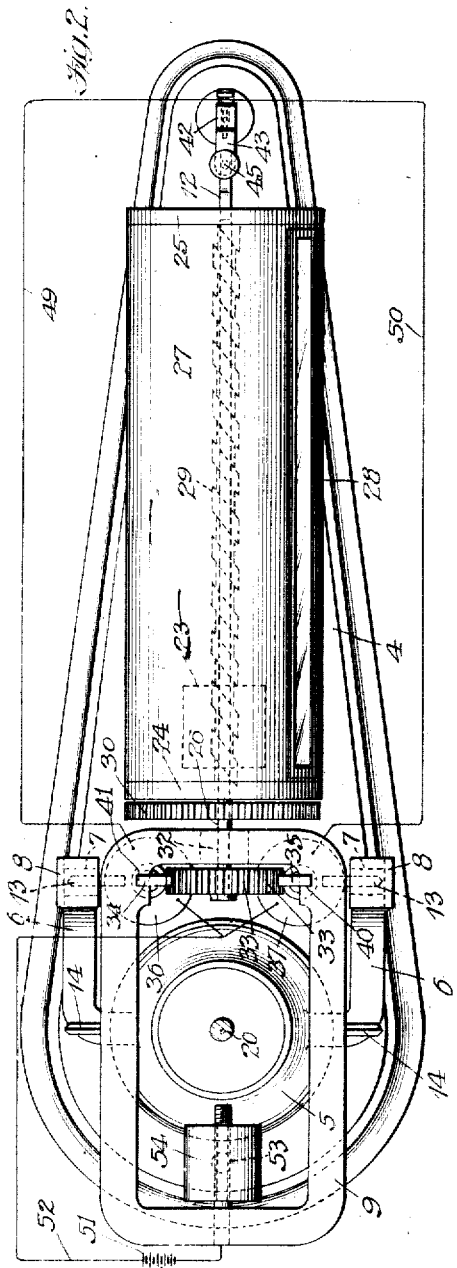

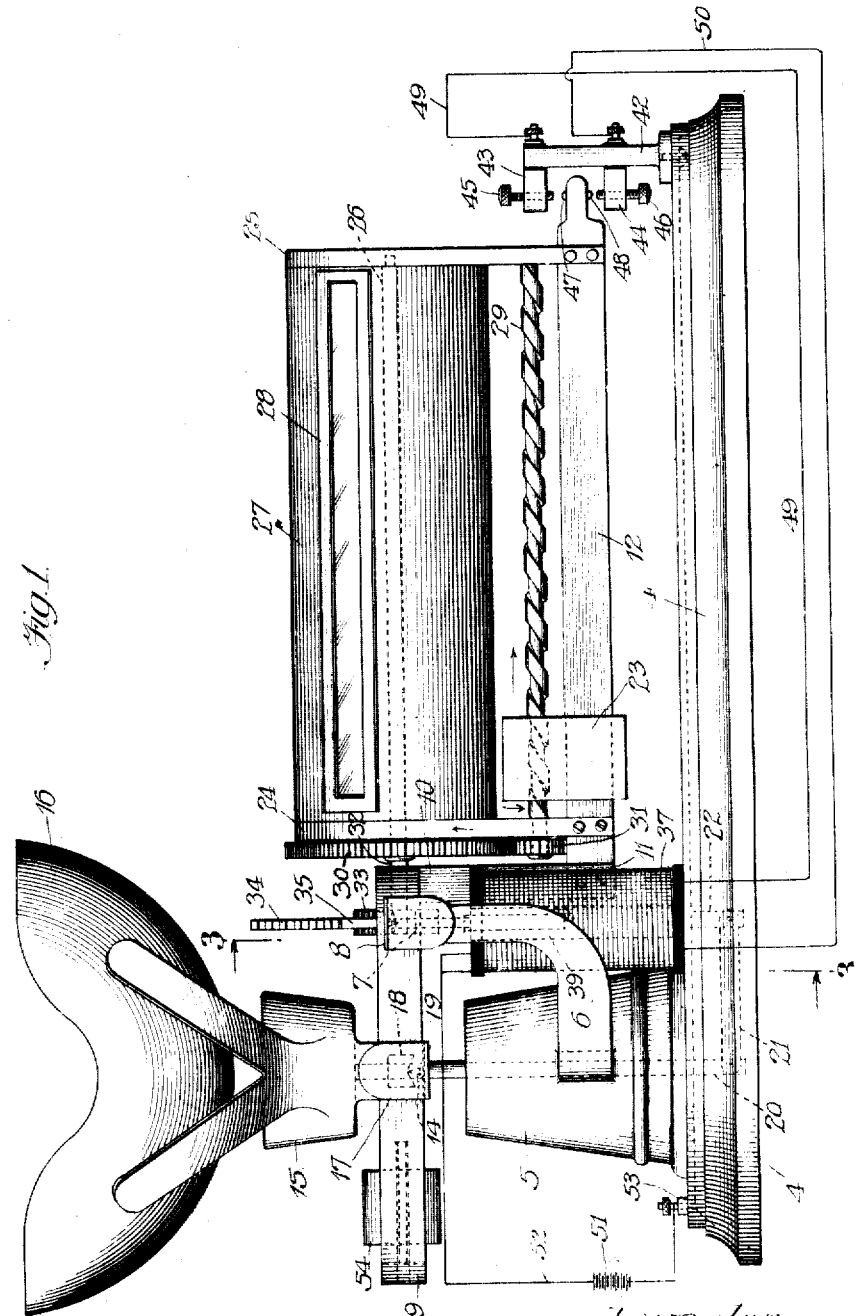

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

WEIGHING-SCALE.

1,287,645.       Specification of Letters Patent.       Patented Dec. 17, 1918.

Application filed December 3, 1913. Serial No. 804,505.

*To all whom it may concern:*

Be it known that I, SAMUEL G. CRANE, a citizen of the United States, residing at Toledo, in the county of Lucas and State of Ohio, have invented certain new and useful Improvements in Weighing-Scales, of which the following is a specification.

My invention relates more particularly to that class of beam scales in which the poise for counterbalancing or offsetting the load in the scale pan is automatically fed along the beam until equilibrium is reëstablished. Heretofore it has been proposed to mount electrical apparatus upon the beam, by which the position of the poise is controlled, but such constructions not only impose excessive load upon the scale beam and its knife edges but present difficulties in the way of providing for the proper electrical connections, the precise nature of which it is not necessary here to consider. In the scale which forms the subject-matter of this application these difficulties are avoided by mounting the electrical apparatus directly upon the base of the scale and providing suitable mechanical connections with the poise whereby the latter may be automatically adjusted.

In the accompanying drawings, I have illustrated, and in the following specification described in detail, a preferred form of scale embodying my invention, but it is to be understood that the specific disclosure is for the purpose of exemplification only and that the scope of the invention is set forth in the following claims in which I have endeavored to distinguish it from the prior art so far as known to me without, however, relinquishing or abandoning any portion or feature thereof.

In the drawings, Figure 1 is a side elevation of the scale which I have chosen to exemplify my invention; Fig. 2 a plan view thereof partly in section; and Fig. 3 a transverse section upon the broken line 3—3 of Fig. 1 looking in the direction of the arrows. The same reference symbol is used throughout the several views to designate each part.

The base 4 may be cast or otherwise formed in any desired shape and has mounted upon one end thereof a casting comprising a column 5 and a pair of arms 6. The latter are formed at their upper ends with cavities in which are mounted bearing blocks 7, 7 of agate or other suitable material which, as shown, are angularly concave upon their upper faces for the reception of the knives of the beam. Cover plates 8, 8 are applied to the upper ends of the arms to protect the bearings and knives. The scale beam comprises a horizontal rectangular frame 9 which is preferably cast integral with a depending support or upright 10 to the lower end of which, as at 11, is secured a bar 12 extending parallel to the frame. Knives 13, 13 for supporting the beam upon the horns 6, 6 are embedded in the metal of frame 9 and extend on opposite sides thereof where they rest upon the bearing blocks 7, 7 before mentioned, and other knives 14, 14 with upwardly directed edges are arranged substantially in the transverse plane through the center of the column 5 for supporting the spider 15 which receives the scale pan 16. Said spider is cast with downwardly projecting legs 17 having sockets extending upwardly from the lower ends thereof in which are mounted bearing blocks 18, which rest upon the knives 14 before mentioned. Plates 19 close the lower ends of said sockets. A post or check rod 20 is cast or otherwise secured in the spider casting centrally thereof and projects downwardly therefrom through an axial opening in the top of the column 5 and is connected at its lower end by a link 21 with a post 22 secured to the base in any suitable manner.

The bar 12 forms a guide for the sliding poise 23 which is mounted thereon and also carries a pair of uprights 24, 25 in which is journaled the axle 26 of a cylindrical chart, the surface of which is printed with weight indications and computations for indicating the total price of the commodity being weighed at various prices per unit of weight. The cylindrical chart is inclosed in a suitable casing 27 and may be read through the opening 28 therein. A worm shaft 29 is also journaled in the uprights 24 and 25 above mentioned and extends through and engages in a suitable manner the poise 23 for feeding the latter longitudinally of the bar 12. The axle 26 of the computing cylinder and the shaft of the worm 29 extend through the upright 24 and each has keyed or pinned thereon a gear numbered respectively 30 and 31 in the drawing, the gear 31 upon the worm shaft being much smaller than that upon the chart axle so that the worm is turned much more rapidly than the chart. The axle of the chart beyond the gear 30 is extended through a bearing 32 in the frame 9 and carries a gear 33 in the plane of the fulcrum knives 13 through the medium of which gear the cylindrical chart is revolved and the poise fed along to counterbalancing position. Gear 33 is in turn revolved and its position controlled by a pair of racks 34, 35, which engage it upon diametrically opposite sides and are reciprocated by solenoids 36, 37 with the cores 38, 39 of which said racks are respectively directly connected. The bores of the solenoids are somewhat larger in diameter than the cores so that the latter fit somewhat loosely therein, and the racks are guided in vertical kerfs or grooves 40, 41 in the frame 9 whereby they are prevented from binding on the gear wheel notwithstanding the slight rocking motion given to them by the tilting of the scale beam.

The electrical connections of the scale are shown diagrammatically in Figs. 1 and 2 but it will be understood that in actual practice they are, for the most part concealed within the structure of the scale except in so far as they must be exposed to make connection with a source of current. The movement of the beam is utilized to close contacts in the circuits of the respective solenoids when the scale is not in equilibrium. For this purpose a post 42 is secured at the end of the base remote from the column 5 and provided with a pair of brackets 43, 44 which are insulated in any suitable manner from the post and carry adjustable contact screws 45, 46. The tip of the bar 12 extends between the brackets and carries contacts 47, 48 adapted to touch the contact screws 45, 46 respectively. Contact screw 45 and bracket 43 are connected, as shown more particularly in Fig. 1, by wire 49 with solenoid 36, and contact screw 46 and bracket 44 are similarly connected by wire 50 with solenoid 37. A source of current represented in the usual way at 51 is connected on the one hand by a branched conductor 52 to the solenoids and on the other hand to the base of the scale where it is grounded at 53.

The operation of the scale will now be apparent. When the beam is in equilibrium, as for example, when there is nothing in the scale pan, the bar 12 will occupy the intermediate position shown in Fig. 1 with its contacts out of touch with either of the stationary contacts 45 or 46. If now a load be placed in the scale pan the bar 12 will rise to close a circuit through the contact 45 and the solenoid 36 through the connections just described including the metal of the scale, and the wires 49 and 52. The contacts 46 and 48 being out of touch, there will, of course, be no current through solenoid 37 and hence it will not attract its armature. The energization of solenoid 36, however, will cause its core to draw down the rack 34 which will thereupon revolve the gear 33, the cylindrical chart and the worm shaft, thereby feeding the poise 23 outward. So long as the bar 12 is in its upper position with the contacts 47 and 45 in touch this action will continue. The poise will finally reach a point where it restores equilibrium to the beam and if it is not fed beyond this point the bar 12 will drop to the intermediate position when the weight and price of the commodity may be read upon the cylindrical chart. If, however, the poise is overthrown by the momentum of the parts so that the bar 12 drops to close the lower pair of contacts, then a circuit is closed through the other solenoid, the path thereof being traced from the battery through the structure of the scale including beam 12, to screw 46, bracket 44, wire 50, solenoid 37 and wire 52. As soon as the bar 12 breaks the circuit through the upper pair of contacts the solenoid 36 is deënergized and when the circuit is closed through the solenoid 37 as above described, it operates to draw down its core and the rack attached thereto and revolve the gear 33, the cylindrical chart and the worm shaft to move the poise 23 inward or in a reverse direction to that in which it was first fed. Thus as the beam closes the upper and lower contacts successively the poise is fed back and forth until it reaches a point where true equilibrium is established and the weight of the load in the scale pan may be read upon the cylinder. When the load is removed from the scale pan of course the lower contacts are closed and the poise fed inward until it reaches the zero position. At 54 I have illustrated the usual adjustable poise for sealing the scale. The above described scale is simple in construction and operation and imposes no unnecessary burden upon the knife edges of the beam.

I claim:

1. In a weighing scale, a base, a beam, a load receiver connected to the beam, a poise adjustable longitudinally of the beam, an electrically actuated prime mover mounted on the base, a gear in the plane of the fulcrum of the beam, and connections therefrom to the prime mover and to the poise for moving the latter.

2. In a weighing scale, a base, a beam, a load receiver connected to the beam, a poise adjustable longitudinally of the beam, an electrically actuated prime mover mounted on the base, a gear mounted on the beam in the plane of its fulcrum, means for transmitting motion from the prime mover to the gear, and means for transmitting motion from the gear to the poise.

3. In a weighing scale, a base, a beam fulcrumed thereon, a load receiver connected to the beam, a poise adjustably mounted on the beam, an electrically actuated prime mover mounted on the base, a rack driven by the prime mover, a gear mounted on the beam, and directly engaging said rack, and connections from the gear to the poise for moving the latter.

4. In a weighing scale, a base, a beam fulcrumed thereon, a load receiver connected to the beam, a poise adjustably mounted on the beam, a pair of prime movers mounted on the base, a pair of racks driven by the prime movers, a gear mounted on the beam, and coöperating with said racks, and connections from the gear to the poise for moving the latter.

5. In a weighing scale, a base, a beam fulcrumed thereon, a poise adjustable longitudinally of the beam, a gear and connections therefrom to the poise for moving the latter, a rack meshing with said gear, and electromagnetic means arranged to move said rack.

6. In a weighing scale, a base, a beam fulcrumed on the base, a poise adjustable longitudinally of the beam, a gear mounted on the beam and connections to the poise for operating the same from the gear, a pair of racks engaging the gear for operating it in opposite directions, and a pair of electromagnetic means mounted on the base and operating the respective racks.

7. In a weighing scale, a base, a beam fulcrumed on the base, a poise adjustable longitudinally of the beam, a gear mounted on the beam and connections to the poise for operating the same from the gear, a pair of racks engaging the gear for operating it in opposite directions, a pair of electromagnetic means mounted on the base and operating the respective racks, and circuits adapted to be closed by the movement of the beam to complete the circuits through the respective electromagnetic means.

8. In a weighing scale, a base, a beam fulcrumed thereon, a poise movable longitudinally of the beam, a pair of solenoids mounted on the base and arranged as parts of separate circuits, means controlled by the position of the beam for closing either of the circuits through the solenoids, and means controlled by the solenoids for operating the poise.

9. In a weighing scale, a base, a beam fulcrumed on the base, a poise movable longitudinally of the beam, a gear mounted on the beam and connections to the poise for reciprocating the same, racks on opposite sides of the gear for operating the same, circuits including a pair of solenoids, the cores of which solenoids are connected to the respective racks, and contacts in said circuits adapted to be closed by the beam in its upper and lower positions respectively.

10. In a weighing scale, a beam fulcrumed on the base and carrying a load receiver, a poise movable longitudinally of the beam, a rotary chart also mounted on the beam, gearing connecting the chart and poise for operating the same in unison, and means for operating the gearing including driving means arranged in the plane of the fulcrum of the beam.

11. In a weighing scale, a base, a beam fulcrumed on the base, a poise adjustable longitudinally of the beam, a worm shaft for adjusting the poise, a rotary chart mounted on the beam, gearing between the rotary chart and worm, a gear mounted on the shaft of the rotary chart, and arranged in the plane of the fulcrum of the beam and means mounted on the base for rotating the gear.

12. In a weighing scale, a base, a beam fulcrumed on the base, a poise adjustable longitudinally of the beam, means on the beam for adjusting the poise, electromagnetic means mounted on the base out of horizontal alinement with the beam for actuating the poise adjusting means, upper and lower contacts mounted on the base, contacts on the beam adapted to coöperate therewith, and connections from said contacts through the electromagnetic means whereby the position of the beam controls the circuit through the electromagnetic means, and the means for operating the poise.

13. In a weighing scale, a base, a beam fulcrumed on the base and carrying a load-receiver, a poise movable longitudinally of the beam, a prime mover arranged transversely of the beam in vertical alinement with the fulcrum and mounted on the base, and connections between the prime mover and the poise for moving the latter.

14. In a weighing scale, a base, a beam fulcrumed on the base and carrying a load-receiver, a poise movable longitudinally of the beam, electromagnetic means arranged transversely of the beam and mounted on the base, and connections between the electromagnetic means and the poise for moving the latter.

15. In a weighing scale, a base, a beam fulcrumed on the base and carrying a load-receiver, a poise movable longitudinlly of the beam, a pair of vertically-disposed electromagnetic means arranged in planes on opposite sides of said beam, and connections from the poise to said electromagnetic means for moving the poise in opposite directions.

16. In a weighing scale, a base, a beam, a load receiver connected to the beam, a poise adjustable longitudinally of the beam, a reciprocating motor mounted on the base, a rack driven by said motor, a screw engaging the poise, and a pinion on the screw driven by said rack.

SAMUEL G. CRANE.

Witnesses:
H. H. BOGEN,
C. W. FESSENDEN.